W. W. POTTER.
TIRE VALVE.
APPLICATION FILED FEB. 28, 1911.
1,004,464.
Patented Sept. 26, 1911.
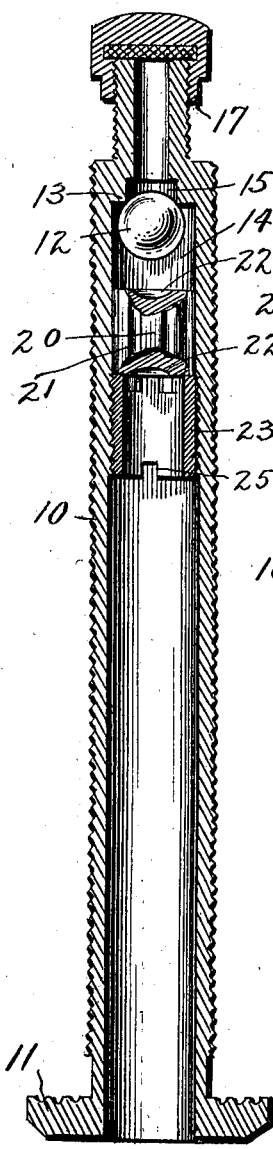
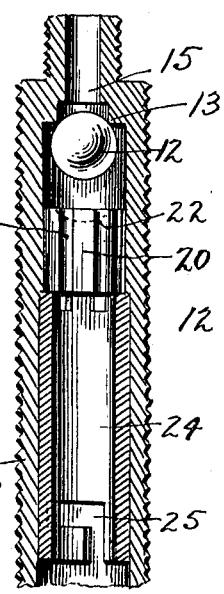
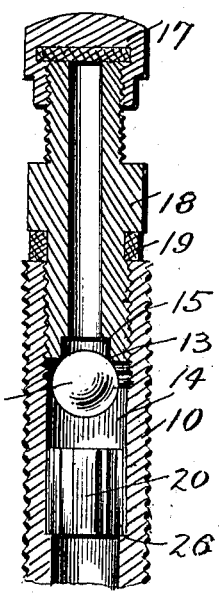
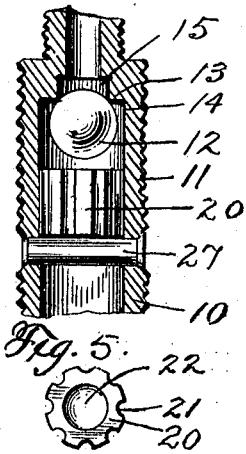
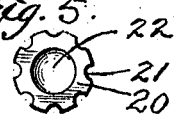
WITNESSES
INVENTOR
William W. Potter,
by Chas. J. Williamson,
Attorney

UNITED STATES PATENT OFFICE.

WILLIAM WALLACE POTTER, OF PAWTUCKET, RHODE ISLAND.

TIRE-VALVE.

1,004,464.　　　　　Specification of Letters Patent.　　Patented Sept. 26, 1911.

Application filed February 28, 1911. Serial No. 611,392.

*To all whom it may concern:*

Be it known that I, WILLIAM WALLACE POTTER, of Pawtucket, in the county of Providence, and in the State of Rhode Island, have invented a certain new and useful Improvement in Tire-Valves, and do hereby declare that the following is a full, clear, and exact description thereof.

The tire valve in common use has structural and functional features that are seriously objectionable. It consists of a multiplicity of parts, including springs, which, by reason of the small space to receive them are small and delicate, so that it is costly to manufacture and liable to easy derangement; it has a large number of packings, and these, of necessity, are of small area, and involve surfaces that are difficult to keep air-tight so that there is likelihood of leakage; and the air passages are unavoidably of such limited capacity that the operation of inflating a tire is hard and slow, and the deflation of a tire is slow, it, indeed, being a practice in deflating automobile tires because of the tardy action of the valve, for chauffeurs to remove the valve mechanism from the stem to hasten the discharge of the air, and this, besides being otherwise objectionable, often results in derangement of the valve parts so that thereafter they fail to work properly.

The object of my invention is to provide a tire valve of such construction that it will be free from the objectionable characteristics of the ordinary tire valve and be otherwise an important improvement thereover.

In the accompanying drawings—Figures 1 to 4 are, respectively, vertical sections of as many different tire valves, embodying my invention; Fig. 5 is a top plan view of the ball supporting plug.

My invention comprehends the employment of a valve in the form of a loose, symmetrical body, preferably, though not necessarily of globular, or ball form, free to move back and forth in a chamber that at its outer end has a valve seat against which the valve body is pressed by internal pressure, and which chamber has suitable means to restrict or limit the movement of the valve body away from its seat under pressure from incoming air from a pump or other source of air under pressure.

In the various forms or embodiments of my invention, the casing or stem 10 is essentially the ordinary tubular form with a tire-engaging foot or flange 11 at the inner end thereof, and in all the embodiments of my invention illustrated, the loose valve body 12 is of globular, or ball form, and preferably of some slightly flexible or yielding material, such as rubber, although I do not restrict myself to any particular kind of material having any particular degree of hardness. In some instances the valve body might have a hard interior and a yielding, or comparatively soft exterior or circumference. As shown in Figs. 1 to 4, inclusive, the valve seat 13 is formed by a sharp edge or corner at the outer end of the valve chamber 14 by means of an axially extending passage or opening 15 of less diameter than the valve body and said chamber, and as I prefer to make it, and as illustrated in Figs. 1, 2 and 4, said opening or passage is provided in a solid or integral portion of the valve stem or casing 10 in order to avoid the presence of any openings or joints that might require packing in order to render them air-tight. The outer end of the stem through which said opening 15 passes is reduced in diameter, as usual, and threaded externally to provide the customary nipple for attaching the inflating tube and for attaching the usual closing cap 17. As illustrated in Fig. 3, instead of the integral formation, the valve seat and the opening 15 extending therefrom may be in a separate thimble 18 which is screwed either into or upon the outer end of the flat stem or casing 10, in which case a packing 19 is applied to the outer end of the valve stem to close the joint thus formed thereat.

The chamber containing the loose valve body 12 is sufficiently larger in diameter than the diameter of the valve to provide an ample space around the valve body for the passage of air, and to limit the inward movement of the valve body, various devices may be employed. Thus as illustrated in Figs. 1, 2, 3, 4 and 5, said limiting devices may be given the excellent form of a short cylindrical plug 20 of a diameter snugly to fit within the valve stem, and having in its periphery numerous longitudinally extending grooves or channels 21 which provide for the free and abundant passage of air past said plug in an inward direction for inflating the tire and in an outward direction for deflating the tire. In the end of the plug, toward the valve body, is formed a cavity or depression 22 centrally located in which the valve body is seated by the inward pressure of air upon it, said cavity or depression thus forming a centering means holding the valve in alinement with its seat so that instantly upon the existence of an outward pressure upon the valve the latter will be moved directly to its seat without any sidewise tendency that might hinder or prevent the proper seating of the valve. As a matter of convenience both ends of the plug may be provided with the centering cavity or recess as shown in Fig. 1, so that in assembling the parts it will be immaterial which end of the plug is first inserted. The plug may be supported at its inner end in various ways. Thus, as illustrated in Figs. 1 and 2 (in which case the plug must be inserted from the inner end of the tube) a supporting sleeve is shown, which, as illustrated in Fig. 1, consists of an externally threaded sleeve or tube 23 which engages the internal thread in the valve casing or stem, while in the form illustrated in Fig. 2, it is a piece of tubing 24 fitting friction tight in the valve stem or casing, and at its outer end engaging a limiting seat or stop shoulder. In both sleeves illustrated in Figs. 1 and 2, the ends next the plug are provided with slots or notches 25 for the passage of air into or from the sleeves. In the screw form sleeve illustrated in Fig. 1, notches are provided in the inner end for engagement by a screw driver for the insertion and withdrawal of the sleeve; and in the case of the sleeve illustrated in Fig. 2, at the inner end thereof is provided an L-shaped slot for engagement by a suitable tool for its withdrawal if necessary.

In the form of my invention illustrated in Fig. 3, in which the plug 20 can be inserted from the outer end of the tube, a simple stop shoulder 26 is formed in the valve stem or casing which engages the inner end of the plug.

In the form of my invention illustrated in Fig. 4, a diametrically extending pin 27 riveted in alining holes passing through the valve stem or casing may be the form of the plug supporting device.

Structurally my valve could not be simpler for it requires but a single movable member or element. It, therefore, can be made very cheaply, and by reason of its extreme simplicity it can be infallibly depended upon to perform its function. As the valve body is the only member or element that must be moved, and as it is free or loose, a minimum of effort is required to inflate a tire, and as the air passages can be of very large area, the labor and time required to inflate a tire are materially reduced compared with valves in ordinary use, actual test showing that about half the effort in labor and half the time is required; and the large area of the air passages enables deflation of the tire to be quickly performed. All that is required in deflating a tire is to thrust some small object, such as a match stick, against the valve body to move and hold it from its seat. The valve body has a very large area, and hence, the air pressure quickly moves it to its seat and firmly holds it there.

The plug 20 it will be seen provides an end surface for engagement by the valve 12 free from any sharp or angular formation with which the valve could have contact, that, of course, would result in cutting or wearing of the valve and the production of a surface thereon which might preclude a tight joint being formed by the valve 12 and its seat, this being of especial importance when the valve, or its surface, is of rubber or other comparatively soft material.

Having thus described my invention what I claim is—

1. In a valve for pneumatic tires in which the closing element is wholly a ball, means for limiting the movement of the ball from its seat consisting of a cylindrical plug having peripheral air passages running from end to end thereof, and said plug having in its ends depressions or cavities, each of which is adapted, according to the position of the plug, to center the ball.

2. A tire valve comprising a valve stem or casing having a valve chamber, a loose valve body in said chamber, a valve seat at one end of said chamber, and means secured in the casing to limit the movement of the loose valve body in the direction away from the valve seat and consisting of a plug in the casing, having longitudinally extending air passages in its periphery.

3. A tire valve comprising a valve stem or casing having a valve chamber, a loose valve body in said chamber, a valve seat at one end of said chamber; and means to limit the movement of the loose valve body in the direction away from the valve seat, and consisting of a plug having longitudinally extending peripheral grooves or channels, said solid plug having a valve body receiving recess or cavity.

4. A tire valve comprising a valve stem or casing having a valve chamber, a loose valve body in said chamber, a valve seat at one end of said chamber, means to limit the movement of the loose valve body in the direction away from the valve seat, consisting of a plug having longitudinally extending peripheral grooves or channels, and a sleeve secured in the stem or casing forming a support for said plug the end of the plug opposite that engaged by the valve body bearing upon said sleeve.

In testimony that I claim the foregoing I have hereunto set my hand.

WILLIAM WALLACE POTTER.

Witnesses:
 John William Thomas,
 Malcolm Smethurst.